United States Patent [19]
Lyon

[11] Patent Number: 5,980,110
[45] Date of Patent: Nov. 9, 1999

[54] MANIFOLD FOR SELF-COMPENSATING HYDROSTATIC BEARING WITH INTEGRAL COMPENSATORS

[75] Inventor: Gregory S. Lyon, Mamaroneck, N.Y.

[73] Assignee: Thomson Industries, Inc., Port Washington, N.Y.

[21] Appl. No.: 09/113,737

[22] Filed: Jul. 10, 1998

[51] Int. Cl.$^6$ ............................................. F16C 32/06
[52] U.S. Cl. ............................................................ 384/12
[58] Field of Search ........................................ 384/12, 13

[56] References Cited

U.S. PATENT DOCUMENTS

| | | |
|---|---|---|
| 2,449,297 | 9/1948 | Hoffer . |
| 3,582,159 | 6/1971 | Uhntenwoldt . |
| 3,635,532 | 1/1972 | Zerbola ..................................... 384/12 |
| 3,754,799 | 8/1973 | Hedberg . |
| 3,900,233 | 8/1975 | Thomson . |
| 4,351,574 | 9/1982 | Furukawa et al. . |
| 4,368,930 | 1/1983 | Duchaine . |
| 4,448,460 | 5/1984 | Yamamoto ................................ 384/12 |
| 4,932,067 | 6/1990 | Pester et al. ............................... 384/45 |
| 4,978,233 | 12/1990 | Stotzel et al. ............................. 384/12 |
| 5,010,794 | 4/1991 | Klager .................................. 384/107 X |
| 5,104,237 | 4/1992 | Slocum ..................................... 384/12 |
| 5,391,002 | 2/1995 | Eigenbrod ................................ 384/12 |
| 5,484,208 | 1/1996 | Kane et al. ............................... 384/12 |

Primary Examiner—Thomas R. Hannon
Attorney, Agent, or Firm—Dilworth & Barrese

[57] ABSTRACT

The bearing assembly includes a bearing carriage having a plurality of spaced bearing races and a manifold secured to at least one end of the bearing carriage having a plurality of spaced bearing surfaces. Each manifold bearing surface is aligned with one of the carriage bearing races and includes a bearing compensator including a collector and a supply groove. A plurality of compensation channels are formed in the manifold. Each compensation channel includes a first end in communication with a collector and a second end in communication with one of four longitudinal passages extending at least partially through the bearing carriage. Each longitudinal passage communicates with a pocket formed on one of the carriage bearing races. When pressurized hydrostatic fluid is supplied to the supply grooves of the bearing manifold, the hydrostatic fluid flows from the supply grooves across a gap defined between the manifold bearing surface and a support rail into a collector where it is directed into a compensation channel. The hydrostatic fluid in the compensation channels is supplied to one of the longitudinal passages formed in the bearing carriage where it is directed to a pocket formed in a respective bearing race of the bearing carriage. The compensation channels are configured to direct fluid from a bearing surface of the manifold to a diametrically opposite bearing race of the bearing carriage to compensate for loading of the bearing carriage.

13 Claims, 6 Drawing Sheets

MANIFOLD FOR SELF-COMPENSATING HYDROSTATIC BEARING WITH INTEGRAL COMPENSATORS

BACKGROUND

1. Technical Field

The present invention relates to a linear motion hydrostatic bearing assembly and, more particularly, to a self-compensating linear motion hydrostatic bearing assembly having a manifold which interconnects spaced bearing races of the bearing assembly to compensate for loading of the bearing assembly.

2. Background of Related Art

Linear motion hydrostatic bearings are well known and have been used for many years for the near frictionless movement of masses. Hydrostatic bearings are characterized as having excellent low friction, accuracy, and repeatability characteristics, with a theoretically infinite life. Hydrostatic bearings also have excellent damping characteristics which result from hydrostatic fluid acting as a shock absorber between the apparatus to which the bearing is associated and an applied load.

Typically, hydrostatic bearings maintain the distance between a bearing race and a support rail by supplying a thin pressurized film of fluid into the gap between the bearing race and the support rail. One type of hydrostatic bearing is a self-compensating hydrostatic bearing. Self-compensating hydrostatic bearings respond automatically to a change in bearing gap by changing the flow of fluid to pockets positioned along the bearing races.

U.S. Pat. No. 5,104,237 ("Slocum") discloses a self-compensating hydrostatic bearing for supporting a bearing carriage along a bearing rail. Slocum's hydrostatic bearing includes geometrically opposed pockets formed in the bearing carriage surfaces facing the bearing rail and compensating units in fluid communication with each of the pockets. Each compensating unit includes an annulus and a hole positioned on the carriage surface. The hole is connected to a pocket positioned on the opposite side of the bearing carriage by a channel formed in the bearing carriage. A constant pressure source of fluid is connected to each annulus to supply fluid to the annulus, where it flows across the bearing gap into the hole and to the opposite side pocket. As a load is applied to the bearing carriage, the resistance of fluid exiting the bearing pocket on the load side increases while the resistance of fluid exiting the bearing pocket on the opposite side decreases. The pressure increases in the pocket on the load side until the differential pressure generated between the two pockets balances. Thus, self-compensation is provided.

Although Slocum's hydrostatic bearing provides self-compensation, the difficulties associated with machining the channels which connect the holes of the compensating units with the pockets positioned on opposite sides of the bearing carriage render the hydrostatic bearing difficult and costly to manufacture.

Accordingly, a need exists for an improved self-compensating hydrostatic bearing which has the ability to compensate for uneven loads and may be manufactured easily and cost effectively.

SUMMARY

In accordance with the present disclosure, a self-compensating linear motion fluid bearing assembly is provided. The bearing assembly includes a bearing carriage having a plurality of spaced bearing races and a manifold secured to one end of the bearing carriage having a plurality of spaced manifold surfaces positioned adjacent to support rail races. Each manifold surface includes a compensator including a collector and a supply groove. A plurality of compensation channels are formed in the manifold. Each compensation channel includes a first end in communication with a collector and a second end in communication with one of four longitudinal passages extending at least partially through the bearing carriage. Each longitudinal passage communicates with a pocket formed on one of the bearing races. When pressurized hydrostatic fluid is supplied to the supply grooves of the bearing manifold, the hydrostatic fluid flows from the supply grooves across a gap defined between the manifold surface and the support rail into a collector where it is directed into a compensation channel of the manifold. The hydrostatic fluid in the compensation channels is supplied to one of the longitudinal passages formed in the bearing carriage and delivered to a pocket formed in a respective bearing race of the bearing carriage. The compensation channels are configured to direct fluid from a manifold surface to a diametrically opposite bearing race to compensate for loading of the bearing carriage.

BRIEF DESCRIPTION OF THE DRAWINGS

Various preferred embodiments are described herein with reference to the drawings, wherein.

DETAILED DESCRIPTION OF PREFERRED EMBODIMENTS

Figure 1:
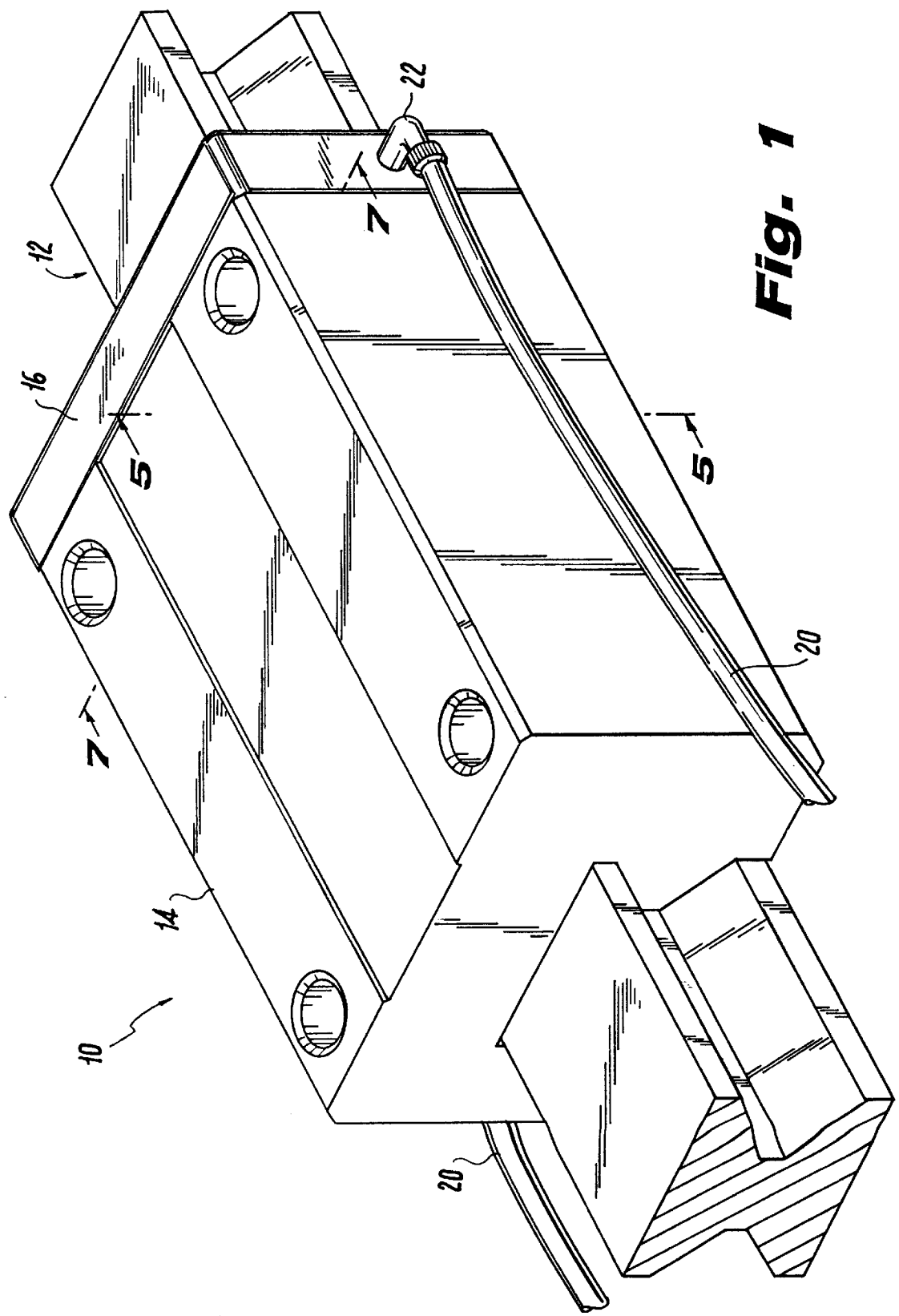
FIG. 1 is a perspective view of one embodiment of the presently disclosed self-compensating linear motion bearing assembly positioned on a support rail.

Preferred embodiments of the presently disclosed self-compensating linear motion hydrostatic bearing assembly will now be described in detail with reference to the drawings, in which like reference numerals designate identical or corresponding elements in each of the several views.

FIG. 1 illustrates one embodiment of the presently disclosed self-compensating linear motion hydrostatic bearing assembly, shown generally as 10. The bearing assembly is slidably supported on bearing rail 12. Briefly, hydrostatic bearing assembly 10 includes bearing carriage 14, a bearing manifold 16 and hydrostatic fluid supply hoses 20. Bearing manifold 16 is secured to one end of bearing carriage 14 and includes fittings 22 adapted to receive one end of supply hoses 20. The other end of supply hoses 20 communicates with a pressurized source of hydrostatic fluid (not shown).

Figure 2:
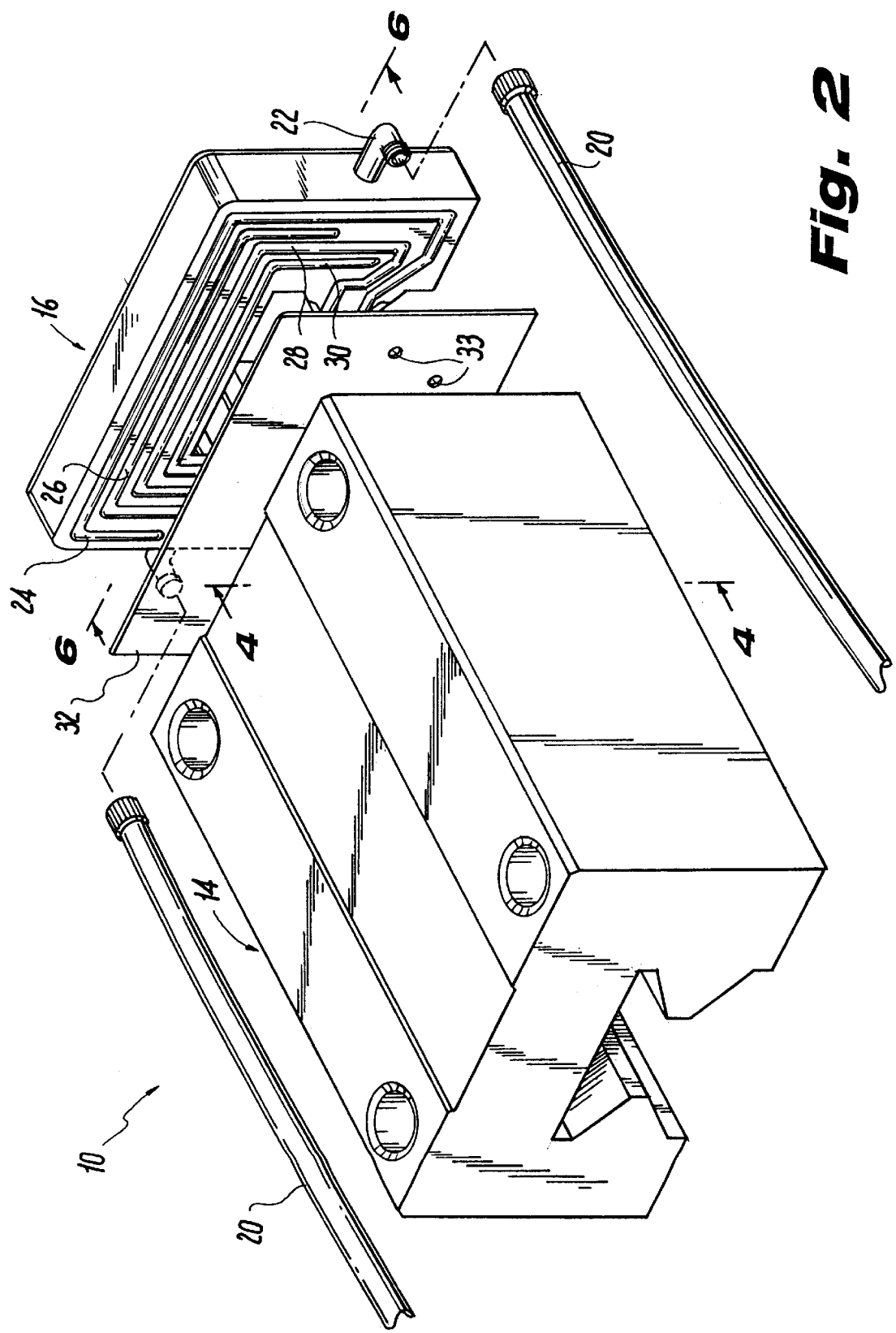
FIG. 2 is a top perspective view with parts separated of the bearing assembly shown in FIG. 1.
Figure 3:
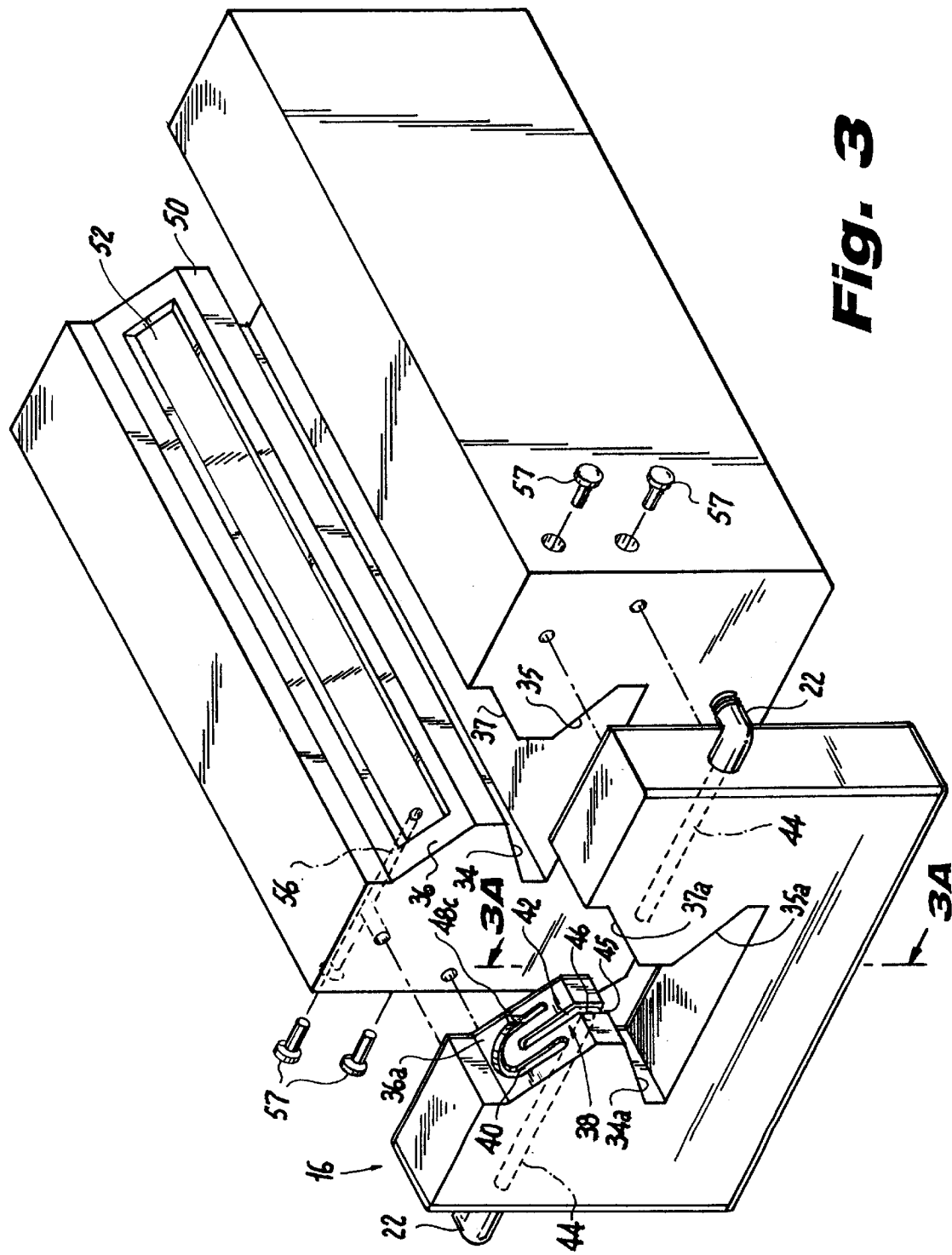
FIG. 3 is a bottom perspective view with parts separated of the bearing assembly shown in FIG. 1.
Figure 3A:
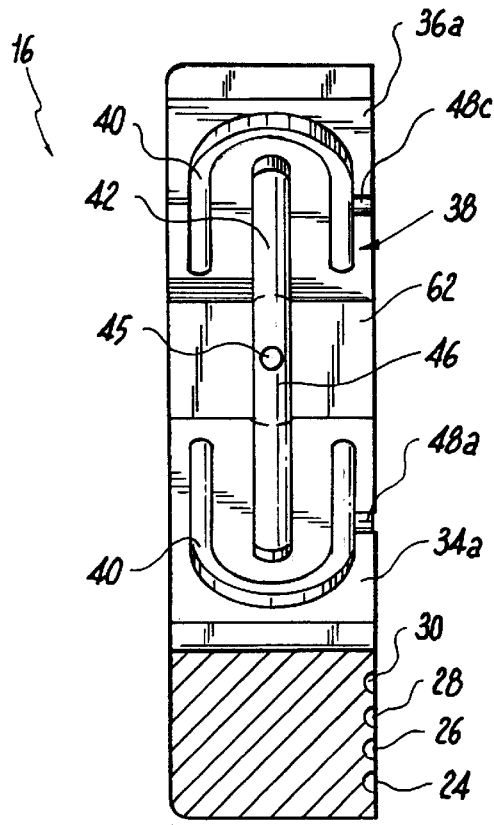
FIG. 3A is a cross-sectional view taken along section line 3A—3A of FIG.3.

Referring to FIGS. 2–3A, bearing manifold 16 includes four compensation channels 24, 26, 28 and 30. The channels may be milled or otherwise formed in the manifold but preferably are investment cast. A gasket 32 can be positioned between manifold 16 and bearing carriage 14 to provide sealing therebetween. Preferably, bearing manifold 16 is brazed onto bearing carriage 14, although other attachment devices may be used, i.e., screws, clamps, etc. Manifold 16 is secured to bearing carriage 14 to enclose each of the compensation channels 24, 26, 28 and 30 to provide four distinct channels within the manifold 16. When a gasket 32 is provided, four holes 33 (only two are shown) are formed through the gasket to provide access to channels 24, 26, 28 and 30. Each hole 33 communicates with one end of a respective compensation channel.

Manifold 16 includes a plurality of manifold surfaces 34a, 35a, 36a and 37a. A bearing compensator 38 formed on each manifold surface includes a collector 40 and a supply groove 42. A transverse channel 44 extends through each sidewall of manifold 16 and includes a supply port 45 which communicates with a central groove 46 which extends between adjacent supply grooves 42 (See FIG. 3A). A supply of pressurized hydrostatic fluid is connected to transverse channel 44 via fitting 22 to supply hydrostatic fluid to supply grooves 42 via central groove 46. Preferably, each collector 40 is U-shaped and extends at least partially about a respective supply groove 42. A return groove 48 connects each collector 40 with a respective compensation channel such that hydrostatic fluid supplied to a supply groove 42 flows from the supply groove across a gap defined between the manifold surface and rail 12 (FIG. 1) into a respective collector 40 and through a respective return groove 48 into a respective compensation channel.

Figure 4:
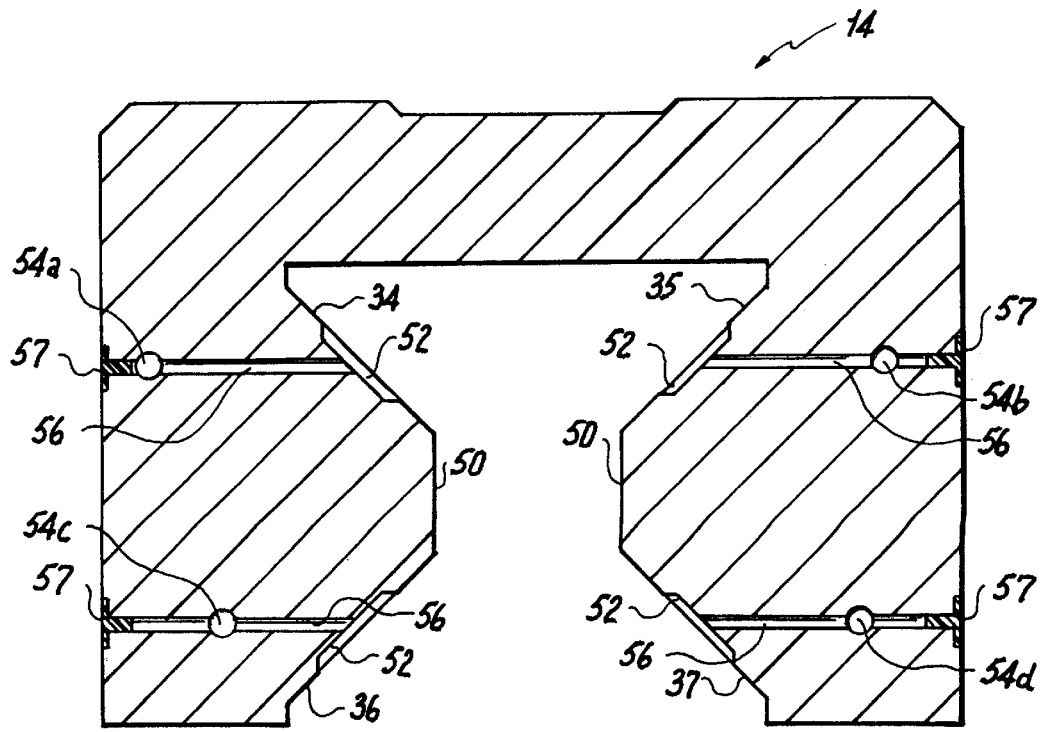
FIG. 4 is a cross-sectional view taken along section line 4—4 of FIG. 2.

Referring to FIGS. 3 and 4, bearing carriage 14 includes a pair of upper bearing races 34 and 35 and a pair of lower bearing races 36 and 37. Upper bearing races 34 and 35 are angled downwardly at an angle of about 30° to about 60° towards the centerline of carriage 14 and lower bearing races 36 and 37 are angled upwardly at an angle of about 30° to about 60° towards the centerline of carriage 14. Preferably, upper and lower bearing races define an angle of about 45° with respect to a vertical plane extending through the longitudinal centerline of the carriage, although other bearing carriage configurations are envisioned. A truncated central portion 50 of carriage 14 is positioned between each respective upper and lower bearing race. Each bearing race includes a longitudinally extending pocket 52 formed thereon. Longitudinal passages 54a–d extend partially through carriage 14. At least one transverse channel 56 connects each of pockets 52 formed on the bearing races of the carriage with a respective one of the longitudinal passages 54a–d. Transverse channels 56 may be formed by drilling holes through the sidewalls of bearing carriage 14 such that the holes intersect a respective longitudinal passage and extend into a pocket 52. The outer end of transverse channels 56 can be sealed with a plug 57.

Figure 5:
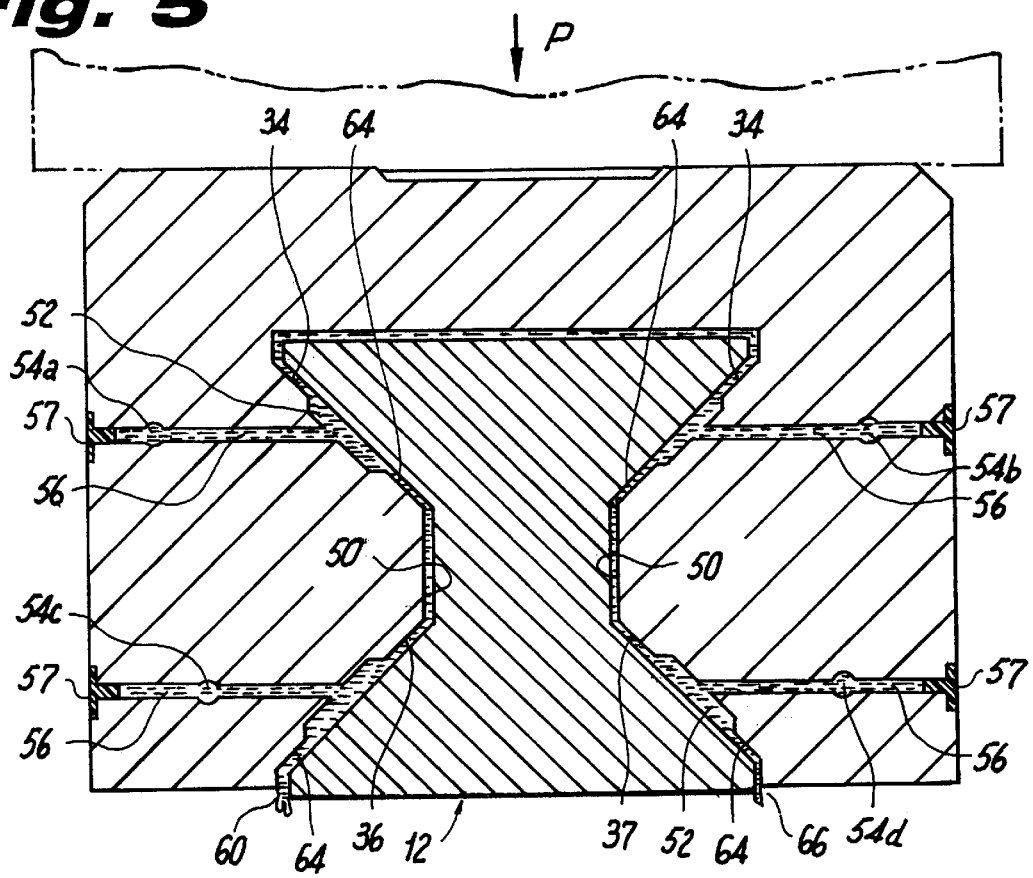
FIG. 5 is a cross-sectional view taken along section line 5—5 of FIG. 1.
Figure 6:
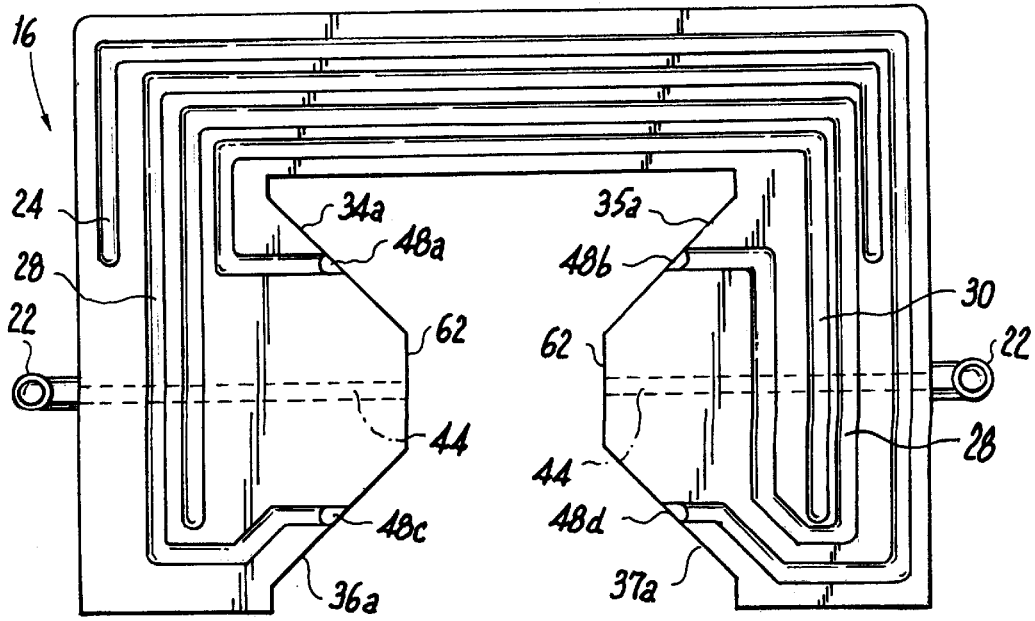
FIG. 6 is an end view taken along section line 6—6 of FIG. 2.
Figure 7:
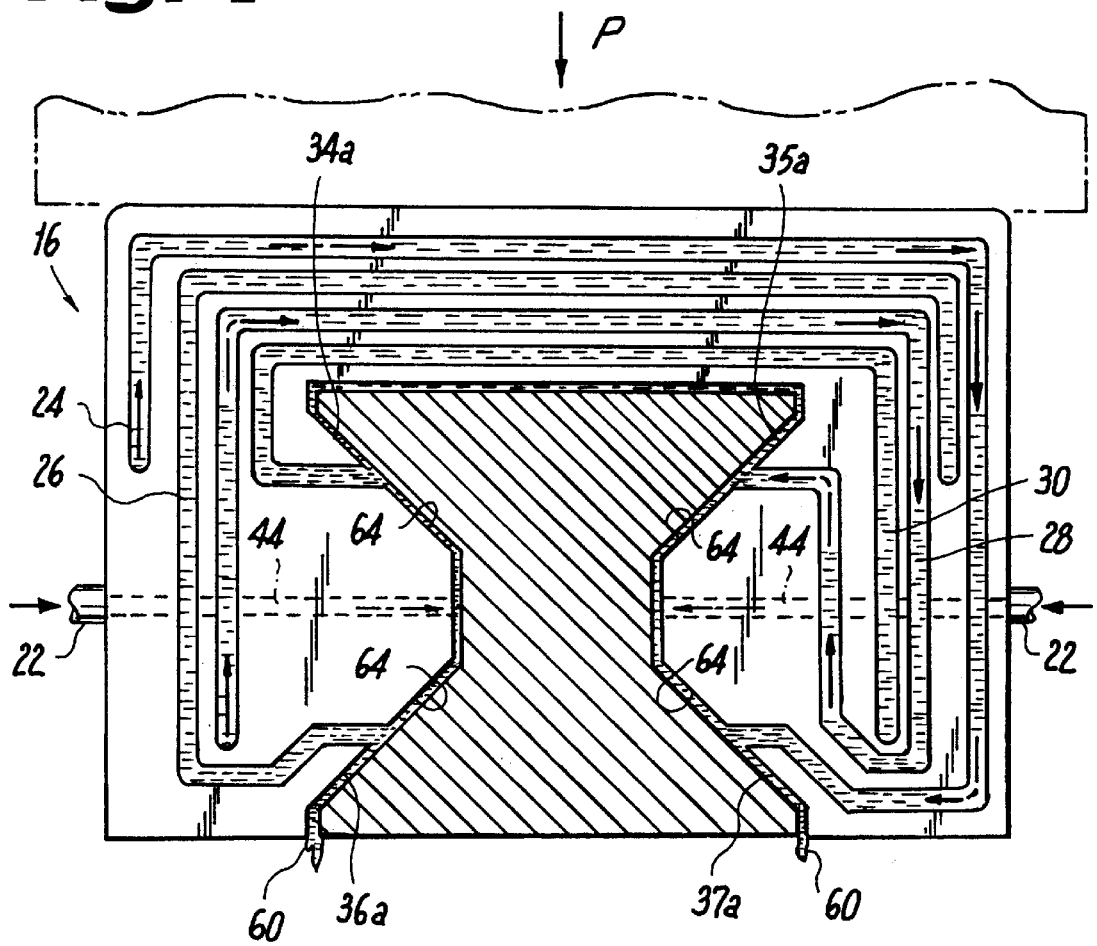
FIG. 7 is an end view taken along section line 7—7 of FIG. 1.

Referring to FIGS. 5–7, pressurized hydrostatic fluid 60 is supplied to transverse channels 44 via fittings 22. Transverse channels 44 communicate with central groove 46 (FIG. 3A) positioned on truncated portions 62 of manifold 16. Pressurized hydrostatic fluid 60 flows from central groove 46 into adjacent supply grooves 42 and across a gap 64 defined between rail 12 and the manifold races 34a–37a. As the fluid 60 fills gap 64, the fluid also fills collectors 40 (FIG. 3A), compensation channels 24, 26, 28 and 30, longitudinal passages 54a–d, and transverse channels 56. See FIG. 7.

Longitudinal channel 54a communicates with one end of compensation channel 24 of manifold 16 while the other end of compensation channel 24 communicates with return groove 48d in collector 40 formed on manifold surface 37a such that hydrostatic fluid 60 entering channel 54a from manifold surface 37a is redirected to pocket 52 in bearing race 34. Longitudinal channel 54b communicates with one end of compensation channel 26 of manifold 16 while the other end of compensation channel 26 communicates with return groove 48c in collector 40 formed on manifold surface 36a such that hydrostatic fluid 60 entering channel 54b from manifold surface 36a is redirected to pocket 52 in bearing race 35. Longitudinal channel 54c communicates with one end of compensation channel 28 of manifold 16 while the other end of compensation channel 28 communicates with return groove 48b in collector 40 formed on manifold surface 35a such that hydrostatic fluid 60 entering channel 54c from manifold surface 35a is redirected to bearing race 36. Longitudinal channel 54d communicates with one end of compensation channel 30 of manifold 16 while the other end of compensation channel 30 communicates with return groove 48a in collector 40 formed on manifold surface 34a such that hydrostatic fluid 60 entering channel 54d from manifold surface 34a is redirected to bearing race 37.

Referring to FIGS. 5 and 7, when a load P is applied to bearing carriage 14, carriage 14 is forced downwardly towards rail 12, increasing gap 64 between bearing races 34 and 35 and rail 12 and also between manifold surfaces 34a and 35a and rail 12, and decreasing the gap between races 36 and 37 and rail 12 and also between manifold surfaces 36a and 37a and rail 12. The difference in the gap between manifold surfaces 36a and 37a and manifold surfaces 34a and 35a and rail 12 causes a differential in hydrostatic fluid flow from collectors 40 on the manifold surfaces to opposite bearing races, causing a stabilizing pressure differential.

It will be understood that various modifications may be made to the embodiments disclosed herein. For example, the configuration of the bearing carriage may be other than as described herein. Further, a manifold may be provided at each end of the bearing carriage to facilitate faster stabilization response time. Therefore, the above description should not be construed as limiting, but merely as exemplifications of preferred embodiments. Those skilled in the art will envision other modifications within the scope and spirit of the claims appended thereto.

What is claimed is:

1. A self-compensating linear motion bearing assembly configured to be slidably supported on a support rail comprising:

a carriage having at least two spaced bearing races, each bearing race having a pocket formed therein and an opening formed in the pocket; and a manifold secured to the carriage having at least one compensation channel and at least one compensator, each of the at least one compensators including a supply groove adapted to be connected to a source of hydrostatic fluid and a collector, each of the at least one compensation channels having a first end communicating with one of the collectors and a second end communicating with one of the openings formed in one of the bearing races, wherein each collector and compensation channel allows hydrostatic fluid to communicate between one of the compensators and one of the bearing race pockets.

2. A self-compensating linear motion fluid bearing assembly according to claim 1, wherein the at least two bearing races include a pair of upper and a pair of lower bearing races and wherein the at least one compensation channel includes four compensation channels, each of the compensation channels being configured to direct hydrostatic fluid from adjacent one of the bearing races to a location adjacent another of the bearing races.

3. A self-compensating linear motion fluid bearing assembly according to claim 2, wherein each of the compensation channels is configured to direct hydrostatic fluid from adjacent one of the bearing races to a location adjacent a diametrically opposed bearing race.

4. A self-compensating linear motion fluid bearing assembly according to claim 2, further including four longitudinally extending passages formed in the carriage, each of the longitudinally extending passages connecting one of the openings formed in the pocket of each of the bearing races to a respective one of the compensation channels.

5. A self-compensating linear motion fluid bearing assembly according to claim 4, wherein each of the bearing races defines an angle of about 30° to 60° with respect to a vertical plane extending through the longitudinal centerline of the carriage.

6. A self-compensating linear motion fluid bearing assembly according to claim 1, wherein the manifold is secured to one end of the carriage.

7. A self-compensating linear motion fluid bearing assembly according to claim 1, further including a fluid supply port formed in the manifold, the fluid supply port communicating with the supply groove.

8. A self-compensating linear motion fluid bearing assembly according to claim 7, further including a return groove formed in each of the collectors, each of the return grooves connecting one of the collectors to one of the compensation channels.

9. A self-compensating linear motion bearing assembly comprising:

a carriage having at least two bearing races spaced from each other; and a manifold secured to the carriage having a fluid inlet port adapted to be connected to a source of hydrostatic fluid and at least one compensation channel configured to direct fluid from adjacent one of the bearing races to a location adjacent another of the bearing races to effect a stabilizing pressure differential on the bearing races.

10. A self-compensating linear motion fluid bearing assembly according to claim 9, wherein the manifold is secured to one end of the carriage.

11. A self-compensating linear motion fluid bearing assembly according to claim 10, wherein the manifold is secured to the carriage by brazing.

12. A self-compensating linear motion fluid bearing assembly according to claim 10, wherein the at least two bearing races includes four spaced bearing races and, wherein the manifold includes four compensation channels, each compensation channel being configured to direct fluid from a location adjacent one of the bearing races to a location adjacent another of the bearing races.

13. A self-compensating linear motion fluid bearing assembly according to claim 12, wherein each of the compensation channels is configured to direct fluid from a location adjacent one of the bearing races to a location adjacent a diametrically opposed bearing race.

* * * * *